United States Patent
Wu

(10) Patent No.: US 9,335,439 B2
(45) Date of Patent: May 10, 2016

(54) PHOTOELECTRIC COUPLING MODULE

(71) Applicant: HON HAI PRECISION INDUSTRY CO., LTD., New Taipei (TW)

(72) Inventor: Kai-Wen Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 271 days.

(21) Appl. No.: 14/014,415

(22) Filed: Aug. 30, 2013

(65) Prior Publication Data

US 2014/0209792 A1 Jul. 31, 2014

(30) Foreign Application Priority Data

Mar. 31, 2013 (TW) .................................. 102103712

(51) Int. Cl.
*G02B 6/40* (2006.01)
*G01V 8/12* (2006.01)

(52) U.S. Cl.
CPC ........................................ *G01V 8/12* (2013.01)

(58) Field of Classification Search
CPC .... G02B 6/4249; G02B 6/4204; G02B 6/423; G02B 6/4259; G02B 6/4214; G02B 6/4292; G02B 6/4202; G02B 6/06; G02B 6/2804; G02B 6/04; G02B 6/262; G02B 6/4206; G02B 6/32; G02B 6/4203; G02B 6/30; G02B 6/3652; G02B 6/4246; G02B 6/4226; G02B 6/4201; G02B 6/4237; G02B 6/3644; G02B 6/3648; G02B 6/4219; G02B 6/4221; G02B 6/4224; G02B 6/4257; G02B 6/426; G02B 6/43; G01D 5/268; G01J 1/04
USPC .......... 250/216, 227.11, 227.28; 385/8, 9, 24, 385/31, 33, 39, 49, 52, 88, 89, 92–94
See application file for complete search history.

(56) References Cited

U.S. PATENT DOCUMENTS 7,338,217 B2 * 3/2008 Morimoto et al. .............. 385/88
7,630,593 B2 * 12/2009 Furuno et al. .................. 385/14

* cited by examiner

*Primary Examiner* — Tony Ko
(74) *Attorney, Agent, or Firm* — Novak Druce Connolly Bove + Quigg LLP

(57) ABSTRACT

A photoelectric coupling module includes a substrate, a photoelectric unit, and a lens module. The substrate carries at least two alignment marks for correct and absolute positioning of the lens module on the substrate. The photoelectric unit is positioned on the substrate. The lens module defines at least two through holes aligned with the alignment marks.

12 Claims, 4 Drawing Sheets

PHOTOELECTRIC COUPLING MODULE

BACKGROUND

1. Technical Field

The present disclosure relates to photoelectric technologies and, particularly to a photoelectric coupling module.

2. Description of Related Art

Photoelectric coupling modules may include a lens module, optical fibers, and a photoelectric unit. The lens module optically couples the optical fibers with the photoelectric unit. However, if the photoelectric unit is misaligned with lenses of the lens module because of manufacturing imprecision, an optical coupling efficiency of the photoelectric coupling module is decreased.

Therefore, it is desirable to provide a photoelectric coupling module that can overcome the limitations described.

DETAILED DESCRIPTION

Embodiments of the disclosure will be described with reference to the drawings.

Figure 1:
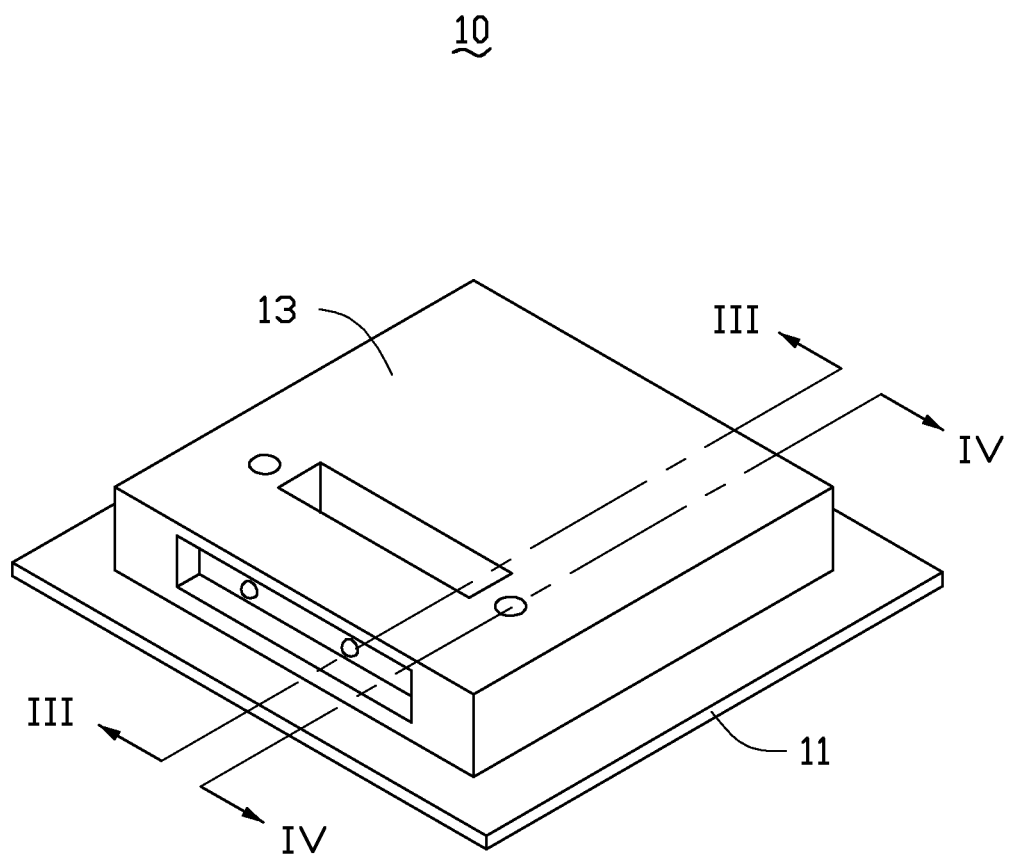
FIG. 1 is a schematic view of a photoelectric coupling module in accordance with an exemplary embodiment.
Figure 2:
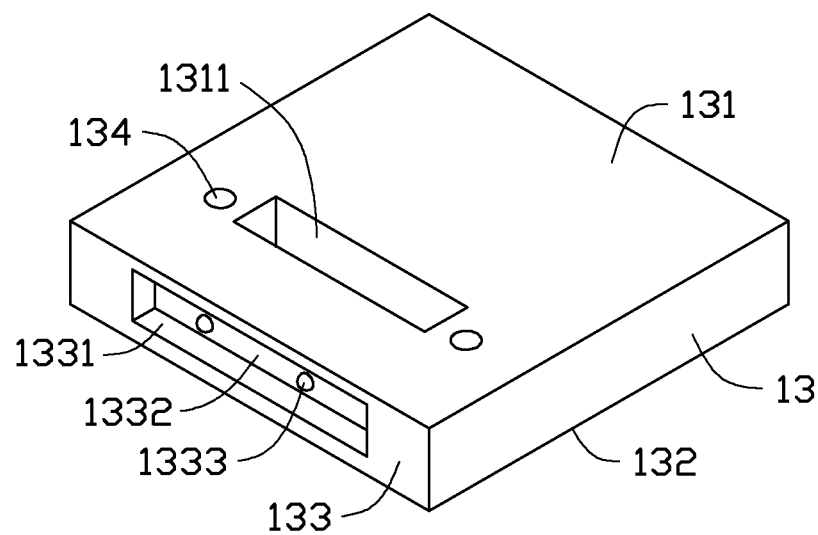
FIG. 2 is an exploded and schematic view of the photoelectric coupling module of FIG. 1.
Figure 2:
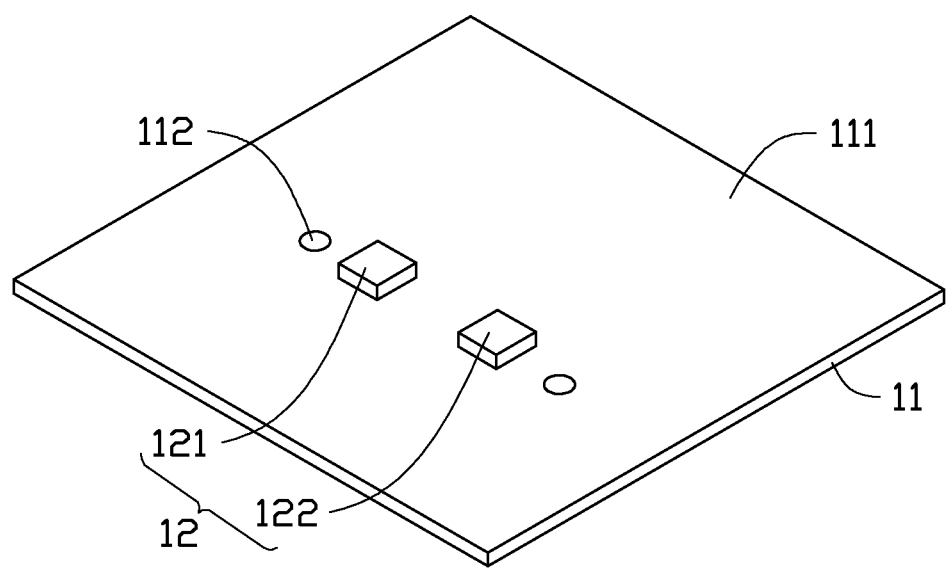
Figure 3:
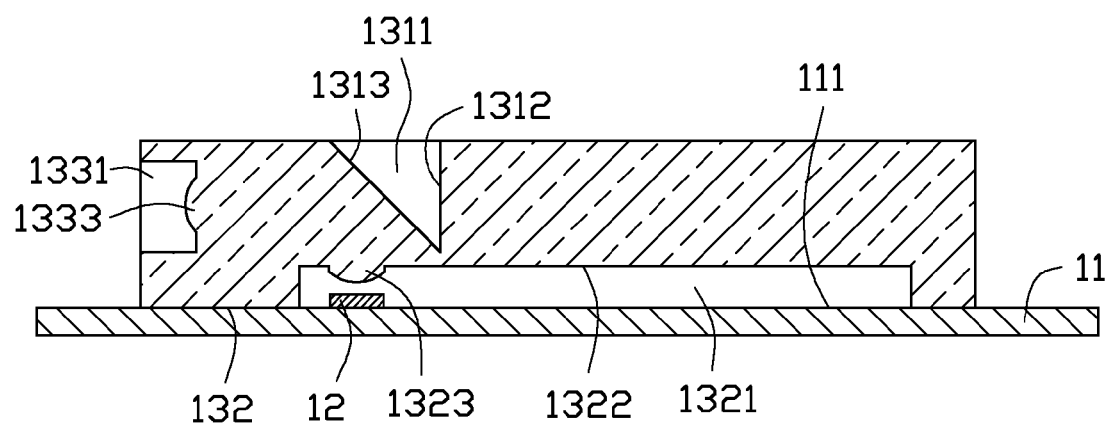
FIG. 3 is a cross-sectional view taken along a line III-III of FIG. 1.
Figure 4:
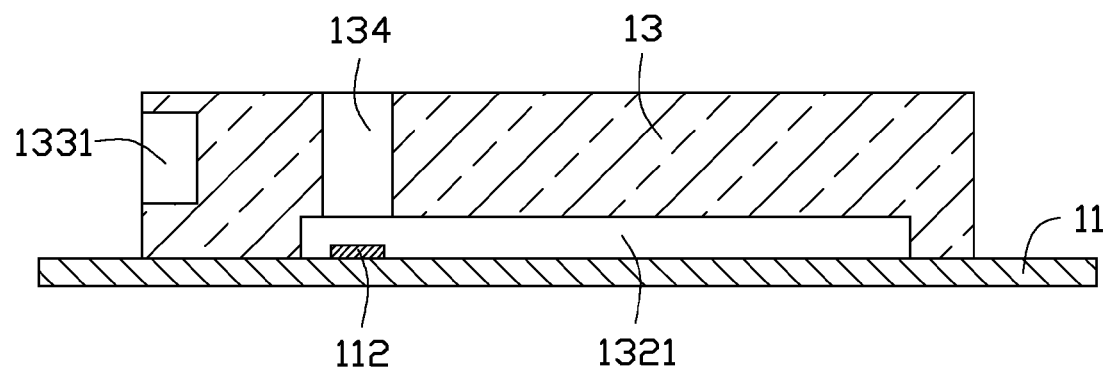
FIG. 4 is a cross-sectional view taken along a line V-V of FIG. 1.

FIGS. 1-4 show a photoelectric coupling module 10 according to an exemplary embodiment. The photoelectric coupling module 10 includes a substrate 11, a photoelectric unit 12, and a lens module 13.

The substrate 11 is a printed circuit board and includes a bearing surface 111. At least two alignment marks 112 are formed on the bearing surface 111. The alignment marks 112 can be recesses defined in the bearing surface 111, protrusions protruding from the bearing surface 111, or coatings coated on the bearing surface 111. In the embodiment, the number of the alignment marks 112 is two. The alignment marks 112 can be integrally molded with the substrate 11, or be separately formed and then combined.

The photoelectric unit 12 is positioned on the bearing surface 111, and includes at least one light emitter 121, such as a laser diode, and at least one light receiver 122, such as a photo diode. The at least one light emitter 121 is electrically connected to the substrate 11, and converts electronic signals into light signals. The at least one light receiver 122 is electrically connected to the substrate 11, and receives and converts light signals into electronic signals. The number of the at least one light emitter 121 is equal to the number of the at least one light receiver 122. The at least one light emitter 121 and the at least one light receiver 122 are linearly arranged between the two alignment marks 112. In the embodiment, the photoelectric unit 12 includes one light emitter 121 and one light receiver 122.

The lens module 13 is substantially rectangular and is made of transparent material, such as plastic or glass. The lens module 13 is supported on the substrate 11. The lens module 13 includes a top surface 131, a bottom surface 132, and a side surface 133. The bottom surface 132 is opposite to the top surface 131, and the side surface 133 is substantially perpendicularly connected between the top surface 131 and the bottom surface 132.

The lens module 13 defines an elongated first recess 1311 in the top surface 131 which is substantially parallel to a line between the alignment marks 112. A cross-section of the first recess 1311 is triangular. The first recess 1311 includes an inner surface 1312 substantially perpendicular to the top surface 131 and a reflection surface 1313 tilting about 45 degrees up from the inner surface 1312.

The lens module 13 defines a substantially rectangular second recess 1321 in the bottom surface 132. The second recess 1321 includes a lower surface 1322 substantially parallel to the top surface 131. At least two first lenses 1323 are formed on the lower surface 1322, located within an orthogonal projection of the reflection surface 1313 onto the bottom surface 132. In the embodiment, the first lenses 1323 are convex lenses. The first lenses 1323 are linearly arrayed and are axially directed towards the reflection surface 1313. The number of the first lenses 1323 is equal to the total number of the at least one light emitter 121 and the at least one light receiver 122. In the embodiment, the lens module 13 includes two first lenses 1323.

The lens module 13 defines a substantially rectangular third recess 1331 in the side surface 133. The third recess 1331 includes an end surface 1332 parallel with the side surface 133. At least two second lenses 1333 are formed on the end surface 1332, located within an orthogonal projection of the reflection surface 1313 onto the side surface 133. In the embodiment, the second lenses 1333 are convex lenses. The second lenses 1333 are linearly arrayed and axially directed towards the reflection surface 1313. The second lenses 1333 are received in the third recess 1331.

The number of the second lenses 1333 is equal to the number of the first lenses 1323. An optical axis of each second lens 1333 is perpendicular to an optical axis of each first lens 1323. The optical axes of the first lenses 1323 cross the optical axes of the second lenses 1333 on the reflection surface 1313. In the embodiment, the lens module 13 includes two second lenses 1333.

The lens module 13 defines at least two through holes 134 running through the top surface 131 and the bottom surface 132. In the embodiment, the number of the through holes 134 is two. The two through holes 134 are positioned at ends of the first recess 1311. The two through holes 134 are linearly arrayed to be parallel to and correspond with the alignment marks 112. The through holes 134 communicate with the second recess 1321.

In assembly, the light emitter 121 and the light receiver 122 are mounted on the bearing surface 111 by a surface-mount technology (SMT). The lens module 13 is positioned on the substrate 11. The alignment marks 112 align with the through holes 134. The alignment marks 112 are wholly exposed from the through holes 134 when the respective optical axes of the first lenses 1323 are correctly aligned with the light emitter 121 and the light receiver 122.

During the signal-transmission process, the light emitter 121 emits light rays to the first lenses 1323 along a direction perpendicular to the bottom surface 1322. The light rays are converged by the first lenses 1323, and are projected onto the reflection surface 1313. The reflection surface 1313 reflects the light rays to the second lenses 1333.

During the same process, the light rays enter into the lens module 13 through the second lenses 1333. The light rays are converged by the second lenses 1333, and are projected onto the reflection surface 1313. The reflection surface 1313 reflects the light rays to the first lenses 1323. The light rays are converged by the first lenses 1323, and are projected to the light receiver 122. The light receiver 122 converts the light rays into electronic signals, and the electronic signals are transmitted to the substrate 11.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A photoelectric coupling module, comprising:
   a substrate comprising a bearing surface, at least two alignment marks formed on the bearing surface;
   a photoelectric unit positioned on the bearing surface; and
   a lens module positioned on the substrate, and comprising a reflection surface, at least two first lenses, and at least two second lenses; optical axes of the first lenses crossing optical axes of the second lenses on the reflection surface; the lens module defining at least two through holes aligned with the alignment marks, the first lenses aligned with the photoelectric unit;
   wherein each of the at least two alignment marks is spaced from the lens module.

2. The photoelectric coupling module of claim 1, wherein the lens module comprises a top surface, and a bottom surface opposite to the top surface, and a side surface connected between the top surface and the bottom surface; the lens module defines a first recess in the top surface, a second recess on the bottom surface, and a third recess on the side surface; the reflection surface is formed in the first recess, the first lenses are received in the second recess, and the second lenses are received in the third recess.

3. The photoelectric coupling module of claim 2, wherein the bottom surface is in contact with the bearing surface, the at least two through holes run through the top surface and the bottom surface.

4. The photoelectric coupling module of claim 3, wherein the alignment marks are wholly exposed from the through holes.

5. The photoelectric coupling module of claim 2, wherein the number of the alignment marks is two, and the photoelectric unit is linearly arranged between the two alignment marks.

6. The photoelectric coupling module of claim 2, wherein the number of the through holes is two, the two through holes are positioned at two ends of the first recess, the two through holes are lineally arrayed along a direction parallel with an extending direction of the first recess.

7. The photoelectric coupling module of claim 1, wherein the number of the first lenses is equal to the number of the second lenses.

8. The photoelectric coupling module of claim 1, wherein the alignment marks are integrally molded with the substrate.

9. The photoelectric coupling module of claim 1, wherein the lens module defines a recess receiving the at least two first lenses, and the at least two alignment marks are received in the recess.

10. The photoelectric coupling module of claim 9, wherein the at least two through holes communicate with the recess.

11. The photoelectric coupling module of claim 9, wherein the recess comprises a lower surface forming the least two first lenses, the at least two alignment marks being spaced from the lower surface.

12. The photoelectric coupling module of claim 9, wherein each of the at least two alignment marks is received in the recess, and spaced from a corresponding one of the at least two through holes via the recess.

\* \* \* \* \*